United States Patent
Kim et al.

(10) Patent No.: US 7,535,846 B2
(45) Date of Patent: May 19, 2009

(54) METHOD FOR HANDLING INTER-RAT MEASUREMENT AND REPORT IN A DUAL-MODE USER EQUIPMENT

(75) Inventors: Yu-Shin Kim, Osan-shi (KR); Ravikumar Kalaimani, Bangalore (IN); Goli Naga Santha Mohan Rao, Bangalore (IN); Jang-Ki Min, Seoul (KR); Bhishma V, Bangalore (IN)

(73) Assignee: Samsung Electronics Co., Ltd (KR)

( * ) Notice: Subject to any disclaimer, the term of this patent is extended or adjusted under 35 U.S.C. 154(b) by 1033 days.

(21) Appl. No.: 10/438,421

(22) Filed: May 15, 2003

(65) Prior Publication Data

US 2003/0218995 A1    Nov. 27, 2003

(30) Foreign Application Priority Data

May 21, 2002   (KR)   .................. 10-2002-0028246

(51) Int. Cl.
*H04W 4/00* (2006.01)
*H04J 3/12* (2006.01)
*H04M 1/00* (2006.01)
*G08C 15/00* (2006.01)

(52) U.S. Cl. .................. 370/241; 370/328; 370/522; 455/552.1

(58) Field of Classification Search .................. 370/315, 370/331–334, 318, 436–437, 241, 328, 522; 455/436–444, 552.1

See application file for complete search history.

(56) References Cited

U.S. PATENT DOCUMENTS 7,092,716 B2 *    8/2006   Nizri et al. .................. 455/448

OTHER PUBLICATIONS

3GPP TS25.331, "RRC Protocol Specification",3GPP TS 25.331 v5.0.0 Release 5, Mar. 2002, p. 30-32, 38, 54, 182-186, 197-198, 253, 269-270, 381-383, 502, 509-512, 524, 532, 839 and 848.*
3GPP TS 25.304 "UE Procedures in Idle Mode and Procedures for Cell Reselection in Connected Mode",3GPP TS 25.304 v5.0.0 Release 5, Mar. 2002, p. 18-22.*

(Continued)

*Primary Examiner*—Kevin C Harper
*Assistant Examiner*—Jianye Wu
(74) *Attorney, Agent, or Firm*—The Farrell Law Firm, PC

(57) ABSTRACT

Disclosed is a method for handling inter-RAT cell measurement in a dual-mode UE in a connected mode, which supports both GSM/GPRS (Global System for Mobile communication/General Packet Radio Service) RAT (Radio Access Technology) and UMTS (Universal Mobile Telecommunications System) RAT. A UTRAN (UMTS Terrestrial Radio Access Network) of the UMTS RAT transmits a measurement control message to a URRC (UMTS Radio Resource Control) of a UMTS network layer in the UE. Upon receiving the measurement control message, the URRC sends a measurement request for GSM cells to an RR/GRR (Radio Resource/GPRS Radio Resource) of a GSM/GPRS network layer. The RR/GRR activates a GSM physical layer and sends a measurement request for the GSM cells to the GSM physical layer. The GSM physical layer performs measurement on the GSM cells and reports a measurement value to the RR/GRR. The RR/GRR reports the measurement value for GSM cells, received from the GSM physical layer, to the URRC. The URRC reports the received measurement value for GSM cells to the UTRAN.

11 Claims, 12 Drawing Sheets

OTHER PUBLICATIONS

3GPP TS 215, "Physical layer—Measurements (FDD)", v5.0.0 Release 5, Mar. 2002.*

3GPP TS25.331, "RRC Protocol Specification",3GPP TS 25.331 v4.0.0 Release 4, Mar. 2001, p. 28-30, 36, 50, 78-83, 156-160, 166-167, 218-223, 248-249, 320-321, 443-464, 678-684, 717.*

3GPP TS 25.304 "UE Procedures in Idle Mode and Procedures for Cell Reselection in Connected Mode",3GPP TS 25.304 v5.0.0 Release 5, Mar. 2002, p. 18-23.*

* cited by examiner

METHOD FOR HANDLING INTER-RAT MEASUREMENT AND REPORT IN A DUAL-MODE USER EQUIPMENT

PRIORITY

This application claims priority under 35 U.S.C. § 119 to an application entitled "Method for Handling Inter-RAT Measurement and Report in a Dual-Mode User Equipment" filed in the Korean Intellectual Property Office on May 21, 2002 and assigned Serial No. 2002-28246, the contents of which are incorporated herein by reference.

BACKGROUND OF THE INVENTION

1. Field of the Invention

The present invention relates generally to a dual-mode user equipment (UE) supporting different radio access technologies (hereinafter referred to as "RAT," and in particular, to a method for performing inter-RAT cell measuring and reporting.

2. Description of the Related Art

GSM (Global System for Mobile communication), a digital mobile telephone system classified as a $2^{nd}$ generation (2G) cellular system, is widely used in Europe and other areas. GPRS (General Packet Radio Service) developed based on GSM, an improved packet-based mobile communication service, is an improved service for a $3^{rd}$ generation (3G) mobile communication system, especially a UMTS (Universal Mobile Telecommunications System) system, for providing high-speed, high-quality voice and multimedia services.

The UMTS system, though it is based on the GSM standard, employs W-CDMA (Wideband Code Division Multiple Access) and provides a service in which mobile phone users or computer users can transmit packet-based text and multimedia data at 2 Mbps or higher no matter where the users are located all over the world. The UMTS system employs a virtual connection concept, called "packet switched connection" using a packet protocol such as an Internet protocol (IP), and can always access any other terminals within the network.

Mobile communication technology will evolve from a 2G cellular system, such as GSM/GPRM, into a 3G mobile communication system such as UMTS. However, the evolution from the 2G technology into the 3G technology will be made gradually over quite a long period. Accordingly, a network operator needs to provide a user with a dual-mode user equipment (or dual-mode mobile terminal) that supports both technologies, i.e., GSM/GPRS and UMTS. In particular, when a mobile subscriber moves from one place to another place across several countries where different RATs are serviced in each radio communication network, the mobile subscriber will need the dual-mode user equipment (hereinafter referred to as "UE"). Therefore, in order to succeed in commercializing the 3G technology, a UE capable of operating in more than one radio access technologies is required. Before the UMTS technology is completely commercialized, users will use dual-mode UEs that support both GSM/GPRS and UMTS. By doing so, the users can be provided with a multi-RAT service in which the dual-mode UEs are switched to the currently available technology such as GSM 900 MHz or GSM 1800 MHz even in an area where the UMTS technology is not available.

In order to support seamless mobility between cells of the same RAT or cells of different RATs through handover and cell reselection, the dual-mode UE must perform measurement on a downlink channel. Meanwhile, in order to order a UE to perform cell reselection, packet cell change, and handover, a network requires a measurement report on 2G and 3G cells from the UE. Likewise, the UE also requires measurement values of two RATs for automatic cell reselection between either same RATs or different RATs.

While a UE in an idle mode is moving from GSM/GPRS coverage to UMTS coverage or vice versa, the UE continuously searches for a better cell to enter. In the idle mode, a measurement report on a serving cell and neighboring cells is triggered for reselection, i.e., automatic cell reselection. In the idle mode, cell reselection can be performed on another RAT based on the measurement report by a UE according to which RAT the UE is currently entering. In order to perform cell reselection, a measurement report on a serving cell and neighboring cells is required, and criteria for inter-RAT cell reselection are estimated from the measurement report.

FIG. 1 illustrates a radio wave environment in which a UMTS UE moves from a UMTS region to a GSM region. Referring to FIG. 1, when a UMTS UE located in a UMTS region moves to a GSM region, the UMTS UE will continuously measure a serving cell. The UMTS UE compares measurement results of a serving cell (or UMTS cell) with a RAT threshold. If a UMTS UE moves from a particular place to the GSM region, signals received at the place from UMTS cells will be very weak. As a result of the movement, if GSM cells have higher signal strength than UMTS cells, and cell selection and reselection criteria are matched with each other, the UMTS UE is switched to a GSM cell.

In order to support both GSM/GPRS RAT and UMTS RAT, a dual-mode UE should have a GSM/GPRS protocol stack and a UMTS protocol stack, and in order for the dual-mode UE to support inter-RAT measurement, interaction between the GSM/GPRS protocol stack and the UMTS protocol stack is required. In other words, in order to acquire measurement results on ordered cells, specification regarding how UMTS and GSM will interact is required. A moving UE has information on a serving cell and information on reserve neighboring cells (or measurement target cells), and these cells are called "ordered cells."

However, a 3GPP ($3^{rd}$ Generation Partnership Project) specification has not provided how inter-RAT measurement should be performed by a multi-RAT UE such as a dual-mode UE.

SUMMARY OF THE INVENTION

It is, therefore, an object of the present invention to provide a method for performing inter-RAT measurement and report for GSM/GPRS and UMTS by interaction between a GSM/GPRS protocol stack and a UMTS protocol stack in a dual-mode UE.

It is another object of the present invention to provide a method for handling inter-RAT measurement so that a dual-mode UE can determine inter-RAT cell reselection based on an inter-RAT measurement value.

It is further another object of the present invention to provide a method for performing inter-RAT measurement and handling measurement reporting to a network by a dual-mode UE so that the network can order the dual-mode UE to perform handover and cell change, based on an inter-RAT measurement value reported from the dual-mode UE.

To achieve the above and other objects, there is provided a method for performing inter-RAT cell measurement in a dual-mode user equipment (UE) in a connected mode, which supports both GSM/GPRS (Global System for Mobile communication/General Packet Radio Service) RAT (Radio Access Technology) and UMTS (Universal Mobile Telecommunications System) RAT. The method comprises the steps of transmitting a measurement control message from a UTRAN (UMTS Terrestrial Radio Access Network) of the UMTS RAT to a URRC (UMTS Radio Resource Control) of a UMTS network layer in the UE; upon receiving the measurement control message, sending by the URRC a measurement request for GSM cells to an RR/GRR (Radio Resource/GPRS Radio Resource) of a GSM/GPRS network layer; activating, by the RR/GRR, a GSM physical layer and sending a measurement request for the GSM cells to the GSM physical layer; measuring, by the GSM physical layer, the GSM cells and reporting a measurement value to the RR/GRR; reporting, by the RR/GRR, the measurement value for GSM cells, received from the GSM physical layer, to the URRC; and reporting, by the URRC, the received measurement value for GSM cells to the UTRAN.

To achieve the above and other objects, there is provided a method for performing inter-RAT cell measurement in a dual-mode UE in an idle mode, which supports both GSM/GPRS RAT and UNITS RAT. The method comprises the steps of: transmitting, by a UTRAN, system information to a URRC of a UMTS network layer in the UE; sending, by the URRC, a measurement request for GSM cells to an RR/GRR of a GSM/GPRS network layer in the UE, and reporting, by the RR/GRR, a measurement value for the GSM cells to the URRC.

To achieve the above and other objects, there is provided a method for performing inter-RAT cell measurement in a dual-mode UE that supports both GSM/GPRS RAT and UMTS RAT. The method comprises the steps of: sending a measurement request for UMTS cells from a RR/GRR of a GSM/GPRS network layer in the UE to a URRC of a UMTS network layer in the UE; activating, by the URRC, a UMTS physical layer in the UE, and sending a measurement request for the UMTS cells to the UMTS physical layer; measuring, by the UMTS physical layer, the UMTS cells and reporting a measurement value to the URRC; and reporting, by the URRC, the measurement value for the UMTS cells received from the UMTS physical layer, to the RR/GRR.

To achieve the above and other objects, there is provided a method for performing inter-RAT cell measurement reporting in a dual-mode UE that supports both GSM/GPRS RAT and UMTS RAT. The method comprises the steps of: sending a measurement request for GSM/GPRS cells from an RR/GRR of a GSM/GPRS network layer in the UE to a GSM/GPRS physical layer in the UE; sending a measurement request for UMTS cells from the RR/GRR to a URRC of a UMTS physical layer in the UE; sending a measurement request for the UMTS cells from the URRC to a UMTS physical layer in the UE; measuring, by the UMTS physical layer, the UMTS cells, and reporting a measurement value to the URRC; measuring, by the GSM/GPRS physical layer, the GSM/GPRS cells, and reporting a measurement value to the RR/GRR; reporting, by the URRC, the measurement value for the UMTS cells, received from the UMTS physical layer, to the RR/GRR; and transmitting, by the RR/GRR, a measurement value for the GSM/GPRS cells measured by the GSM/GPRS physical layer and a measurement value for UMTS cells measured by the UMTS physical layer, to the network.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Figure 1:
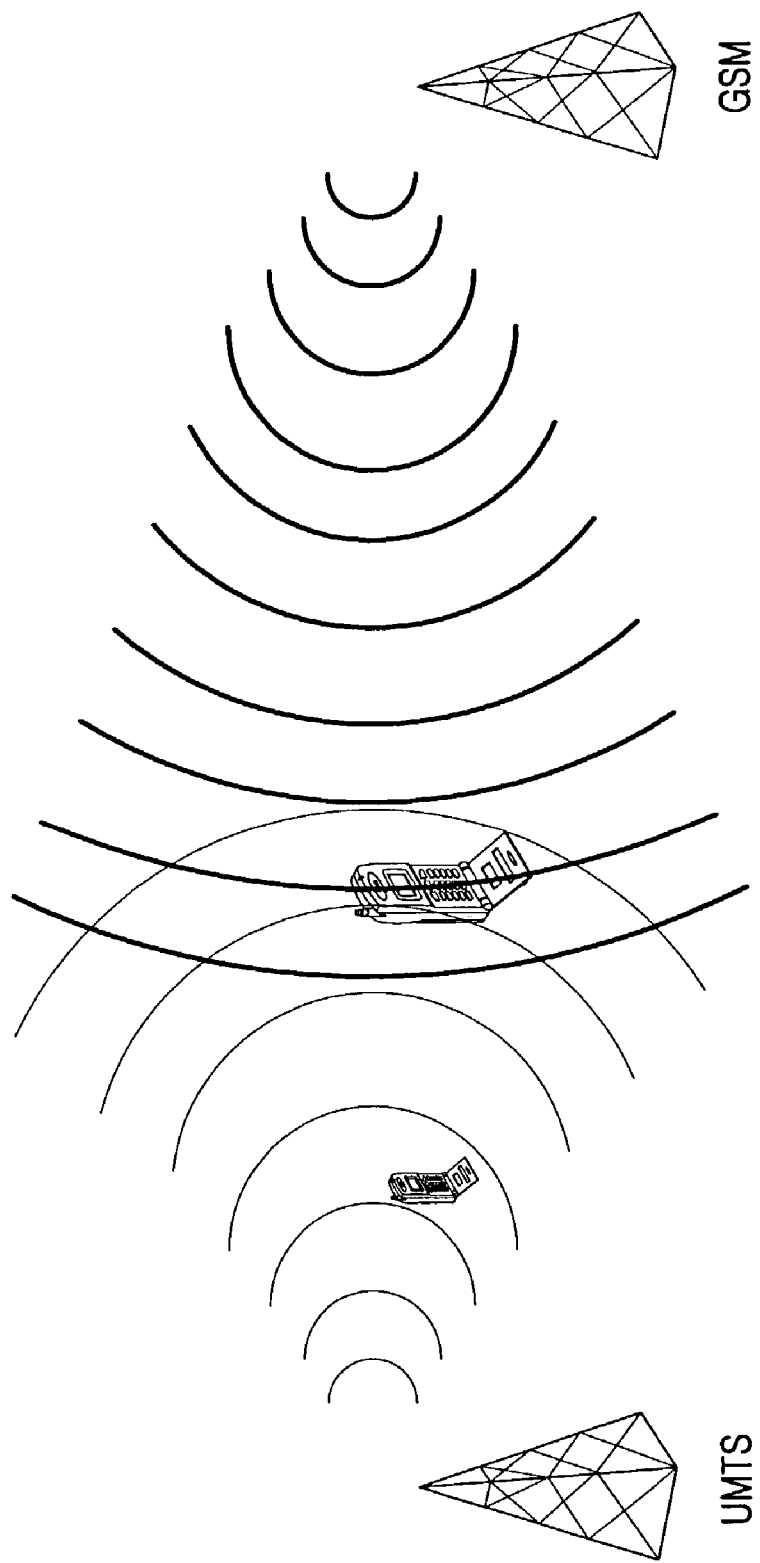
FIG. 1 illustrates a radio wave environment in which a UMTS UE moves from a UMTS region to a GSM region.

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

As indicated above, the present invention provides a method for measuring cells belonging to another RAT (i.e., GSM in a first embodiment, and UMTS in a second embodiment) when a UE supports one RAT (i.e., UMTS in the first embodiment, and GSM in the second embodiment).

The present invention describes how a UE operates based on a measurement control message or a system information block (SIB) #11 or SIB #12 received from a UTRAN (UMTS Terrestrial Radio Access Network), or measurement control information received from a base station (BS). More specifically, the present invention will describe when, what, and why to measure, and when and what to report.

The present invention provides an interfacing method between RR/GRR (Radio Resource/GPRS Radio Resource) and URRC (UMTS Radio Resource Control) for RAT measurement, as an efficient method for saving a battery. According to the above method, cells are not measured when not requested.

The present invention can be applied to a dual-mode UE that supports GSM-TDMA (Time Division Multiple Access) and UMTS W-CDMA. In a first embodiment proposed by the present invention, a UE differently performs measurement according to whether its operation mode is a connected mode or an idle mode. The measurement provides the UE with indispensable information for performing a handover. The UE does not continuously perform measurements in an idle mode and performs measurements only when necessary (when an event condition is satisfied) by using measurement rules for cell selection and reselection, thereby contributing to extension of battery life.

Figure 2:
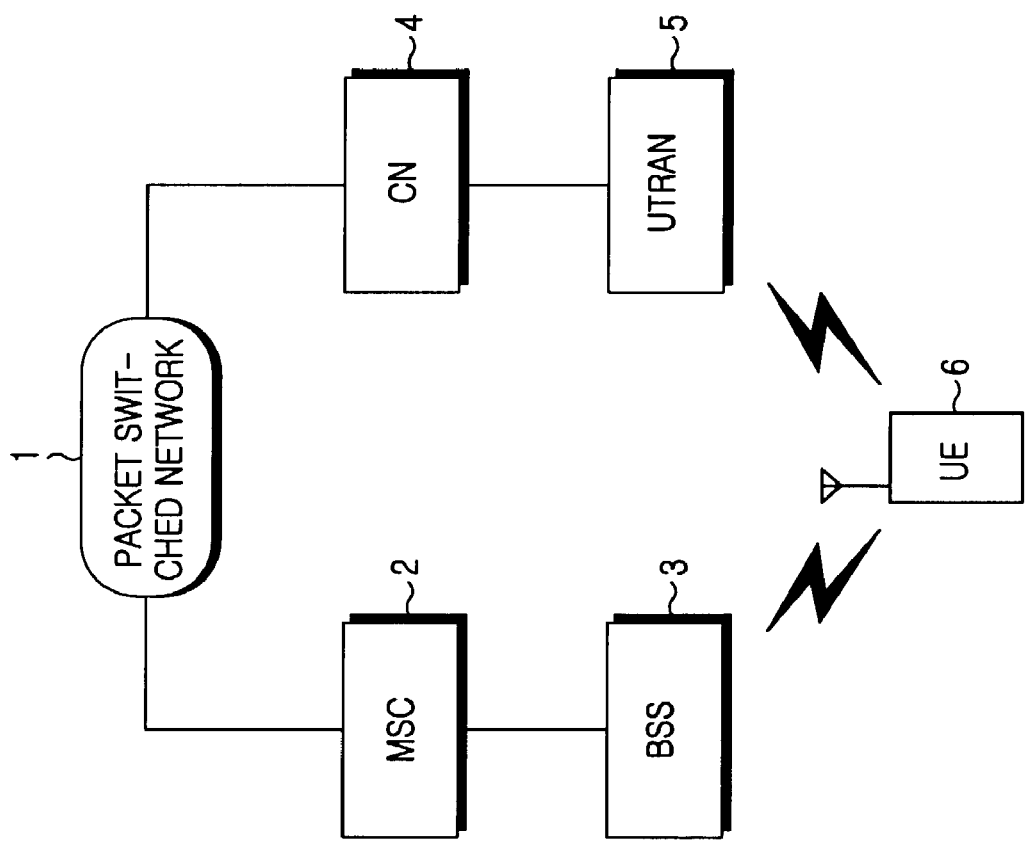
FIG. 2 illustrates a structure of a mobile communication system with a UE that supports GSM/GPRS of 2G RAT and UMTS of 3G RAT.

FIG. 2 illustrates a structure of a mobile communication system with a UE that supports GSM/GPRS of 2G RAT and UMTS of 3G RAT. Specifically, FIG. 2 illustrates a mobile communication system that supports GSM/GPRS RAT and UMTS RAT based on a packet switched network.

Referring to FIG. 2, a base station subsystem (BSS) 3 of GSM/GPRS RAT accesses a packet switched network 1, such as the Internet via a mobile switching center (MSC) 2, and provides voice and data services using a GSM/GPRS-based communication protocol. A UTRAN 5 for UMTS RAT accesses the packet switched network 1 via a core network (CN) 4, and provides voice and data services using a UMTS-based communication protocol. A UE 6, a dual-mode UE that supports both GSM/GPRS and UMTS, performs a call service using the GSM/GPRS-based communication protocol in a service area of the BSS 3, and performs a call service using the UMTS-based communication protocol in a service area of the UTRAN 5. The dual-mode UE 6 has a network layer and a data link layer for controlling logical channels and radio resources provided according to the GSM/GPRS and UMTS-based communication protocols. The network layer and the data link layer correspond to a Layer 3 (L3) and a Layer 2 (L2), respectively, in an open systems interconnection (OSI) model, and should be able to share an upper layer of Layer 4 (L4) or higher, and a Layer 1 (L1) corresponding to a physical layer.

Figure 3:
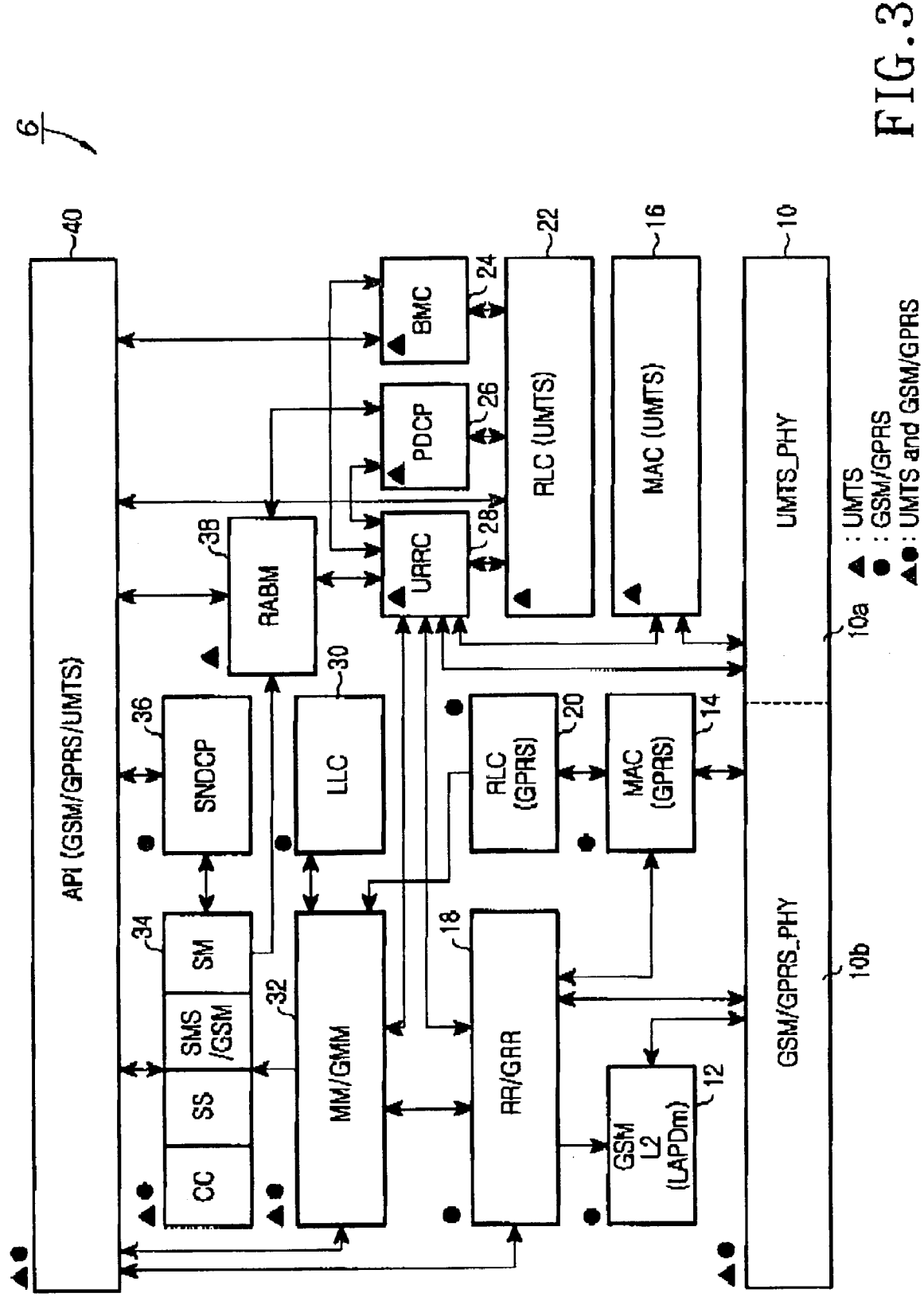
FIG. 3 illustrates a protocol stack and an interlayer interface of a dual-mode UE to which the present invention is applied.

FIG. 3 illustrates a protocol stack and an interlayer interface of a dual-mode UE to which the present invention is applied. In FIG. 3, blocks marked by "▲" indicate UMTS-only blocks, blocks marked by "●" indicate GSM/GPRS-only blocks, and blocks marked by "▲●" indicate combined blocks of GSM/GPRS and UMTS. As illustrated in FIG. 3, GSM/GPRS-UMTS combined blocks marked by "▲●" include MM/GMM (Mobility Management/GPRS-MM) 32, CC(Call Control)/SS(Supplementary Services)/SMS(Short Message Service)/SM(Session Management) 34, and API (Application Protocol Interface) 40. UMTS-only blocks marked by "▲" include UMTS-PHY (Physical Layer) 10a, MAC (Medium Access Control) 16, RLC (Radio Link Control) 22, BMC (Broadcast Multicast Control) 24, PDCP (Packet Data Convergence Protocol) 26, URRC (UMTS Radio Resource Control) 28, and RABM (Radio Access Bearer Management) 38. GSM/GPRS-only blocks marked by "●" include GSM/GPRS-PHY (Physical Layer) 10b, GSM L2 (Layer 2) 12, MAC (Medium Access Control) 14, RR/GRR (Radio Resource/GPRS Radio Resource) 18, RLC (Radio Link Control) 20, LLC (Logical Link Control) 30, and SNDCP (Sub-Network Dependent Convergence Protocol) 36. The API 40 is represented by "API (GSM/GPRS/UMTS)", to indicate that the block is GSM/GPRS-UMTS combined block. The MAC 14 and the RLC 20 are represented by "MAC (GPRS)" and "RLC (GPRS)", respectively, to indicate that those blocks are GPRS-only blocks. The MAC 16 and the RLC 22 are represented by "MAC (UMTS)" and "RLC (UMTS)", respectively, to indicate that those blocks are UMTS-only blocks. In addition, GSM L2 12 is represented by "GSM L2 (LAPDm)" to indicate that this block is a LAPDm (Link Access Procedures for Data Link Layer for mobile applications) block.

In the protocol stack of the dual-mode UE 6 illustrated in FIG. 3, the PHY 10 corresponds to L1, a physical layer. The L1 controls packet transmission and reception, and is divided into a synchronous part and an asynchronous part. The synchronous part implements a frame interrupt state transition diagram, and directly interacts with a digital signal processor (DSP) of the modem side. For example, when the UE 6 desires to measure frequencies or signal levels of neighboring cells, this event is actually performed by the DSP. For that purpose, the corresponding order must be delivered to the DSP and a measurement report must be delivered to an upper layer. Here, the synchronization part is interposed between a protocol stack of an upper layer and a modem of a lower layer, and takes charge of message transmission. The GSM L2 12, the MAC 14, and the MAC 16 correspond to L2, a data link layer, and control transmission of signaling data. The RR/GRR 18, the RLC 20, the RLC 22, the BMC 24, the PDCP 26, the URRC 28, the LLC 30, the MM/GMM 32, the CC/SS/SMS/SM 34, the SNDCP 36, and the RABM 38 correspond to L3, a network layer. The RR/GRR 18 and the URRC 28 of the L3 each control channel assignment, power level control, time alignment, handover order transmission, call setup, and call hold and release in GSM/GPRS and UMTS. The MM/GMM 32 manages and controls user data of the UE 6, which is not directly related to a radio access function. In addition, CC of the CC/SS/SMS/SM 34 manages such events as call setup, call reset, and call termination. The API 40, over the L3, is an upper layer application program comprised of layers of L4 or higher, based on an OSI modem, and performs all additional functions provided by the UE 6, regardless of RAT.

The present invention provides a method for measuring the cells belonging to UMTS RAT when the dual-mode UE 6 is connected to a GSM/GPRS RAT network, i.e., the BSS 3. In the UE 6, if GSM/GPRS is active RAT, UMTS becomes passive RAT. In this case, the UE 6 acquires, from a network in broadcast or an L3 message, 3G cell information parameters for the cells, which are required to perform measurement for cell reselection or transmit a measurement report. If a GSM/GPRS cell measurement value is lower than or higher than a threshold condition broadcasted by the network, the UE 6 triggers measurement.

Figure 4:
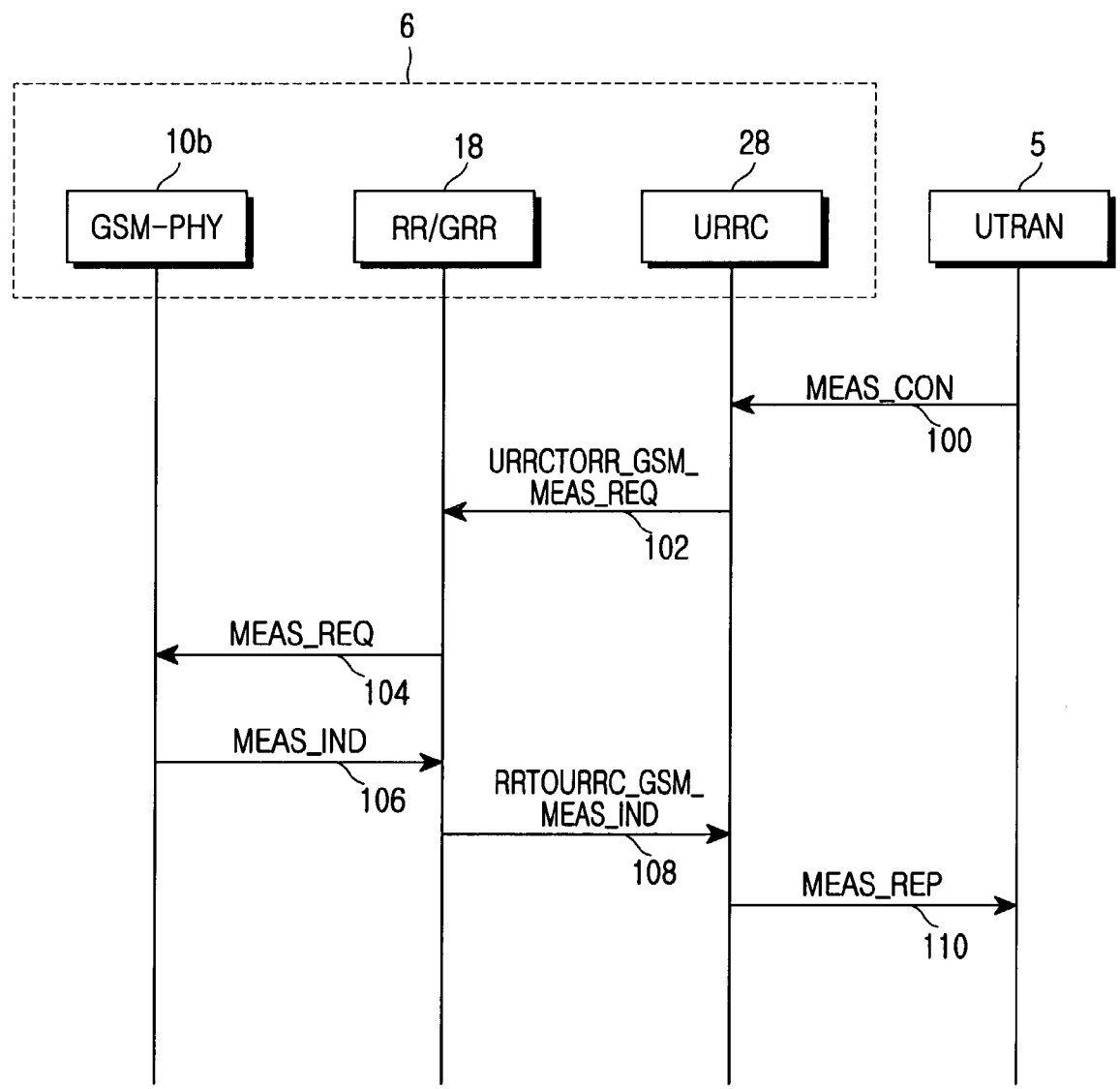
FIG. 4 is a ladder diagram illustrating a RAT measurement method in a connected mode according to a first embodiment of the present invention.

FIG. 4 is a ladder diagram illustrating a RAT measurement method in a connected mode according to a first embodiment of the present invention. The term "RAT measurement" refers to a measurement related to downlink physical channels belonging to another RAT (e.g., GSM) when a UE is connected to one RAT (e.g., UMTS) in response to a request received from a network (e.g., UTRAN). This measurement can be applied to a UMTS multi-RAT UE that supports UMTS RAT and GSM RAT.

A URRC 28 is a UMTS-RRC layer from the viewpoint of a UE. The RRC layer communicates with an RR/GRR 18 for RAT measurement. In step 100, a measurement control message MEAS_CON is transmitted from a UTRAN 5 to the URRC 28. The measurement control message MEAS_CON received at the URRC 28 from the UTRAN 5 includes cell information for various RATs (IS-2000 and GSM), such as measurement value and cell definition, BCCH-ARFCH (Broadcast Control Channel-Absolute Radio Frequency Channel), BSIC (Base transceiver Station Identity Code including a network color code (NCC) and a base station color code (BCC)), cell selection and reselection information, reporting mode (periodic or event-triggered), and report criteria (event list, period and non-report). In step 102, the URRC 28 selects GSM cell information from the measurement control message MEAS_CON, and transmits a GSM measurement request message URRCTORR_GSM_MEAS_REQ to the RR/GRR 18 according to the reporting mode, the report criteria and the measurement value. In step 104, the RR/GRR 18 transmits a measurement request message MEAS_REQ to a GSM/GPRS-PHY 10*b*. The measurement request message MEAS_REQ includes BCCH carrier information. In step 106, the GSM/GPRS-PHY 10*b* performs measurement on GSM cells thereby to update measurement results on the corresponding cells, and transmits a measurement indication message MEAS_IND to the RR/GRR 18. The RR/GRR 18 receives the measurement indication message MEAS_IND and determines whether criteria are matched. If the criteria are matched, in step 108, the RR/GRR 18 transmits a GSM measurement indication message RRTOURRC_GSM_MEAS_IND to the URRC 28. The GSM measurement indication message RRTOURRC_GSM_MEAS_IND includes measurement results on the best 6 cells. In step 110, the URRC 28 transmits a measurement report message MEAS_REP to the UTRAN 5.

The first embodiment of the present invention will be described in more detail herein below with reference to FIGS. 5 to 7.

Figure 5:
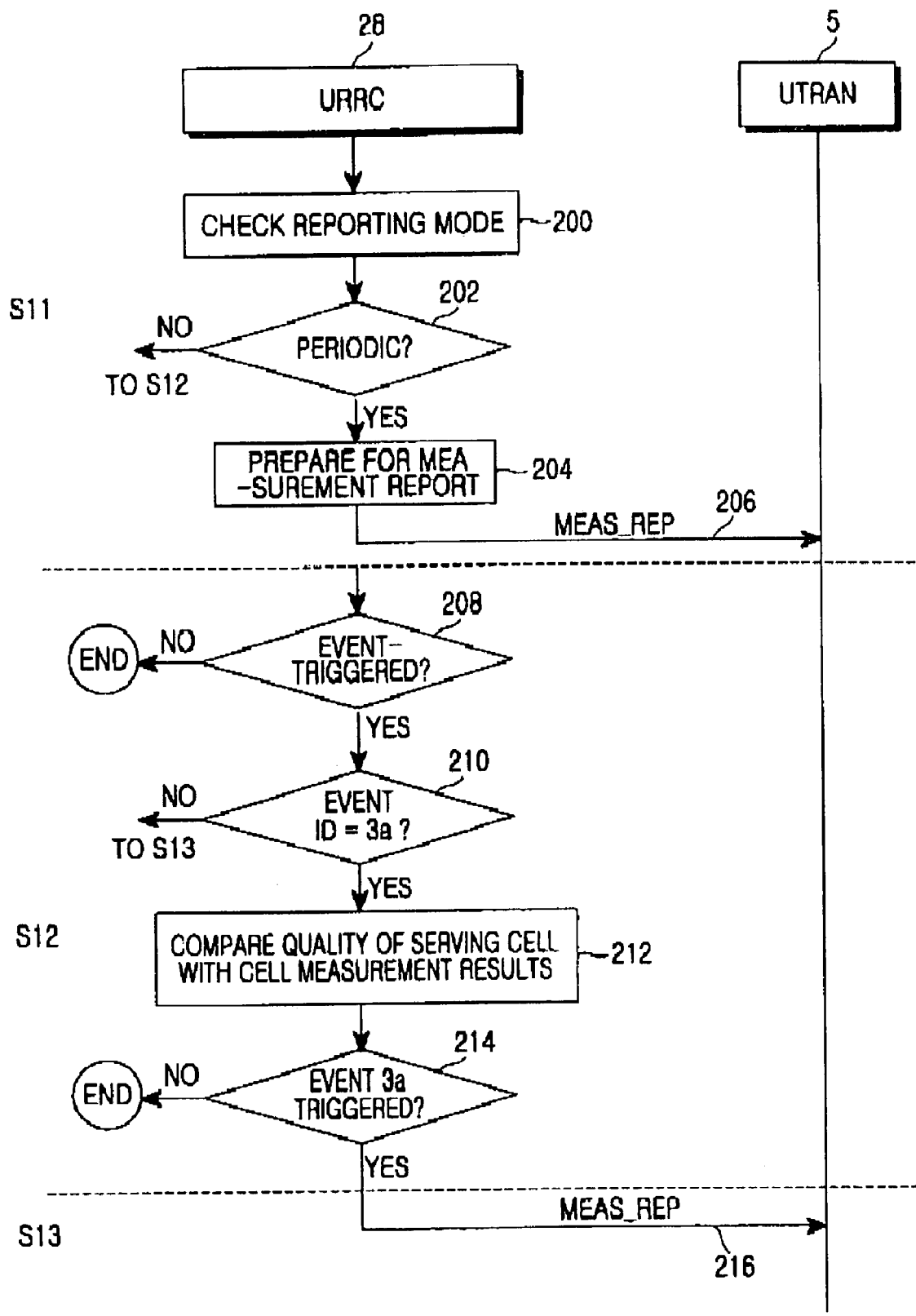
FIG. 5 is a ladder diagram illustrating a procedure for reporting a measurement result to a UTRAN by a URRC, in an inter-RAT measurement method in a connected mode according to the first embodiment of the present invention.

FIG. 5 is a ladder diagram illustrating a procedure for reporting a measurement result to a UTRAN by a URRC, in a RAT measurement method in a connected mode according to the first embodiment of the present invention. FIG. 6 is a ladder diagram illustrating a procedure for transmitting a GSM measurement indication message RRTOURRC_GSM_MEAS_IND to a URRC by an RR/GRR upon arrival of a period, in a RAT measurement method in a connected mode according to the first embodiment of the present invention. FIG. 7 is a ladder diagram illustrating a procedure for transmitting a GSM measurement indication message RRTOURRC_GSM_MEAS_IND to a URRC by an RR/GRR when an event is triggered, in a RAT measurement method in a connected mode according to the first embodiment of the present invention.

Referring to FIG. 5, a URRC 28 checks a reporting mode in step 200. If it is determined in step 202 that the reporting mode is set to "periodic," the URRC 28 prepares for measurement reporting in step 204, and transmits a measurement report message MEAS_REP to a UTRAN 5 in step 206. The measurement report message MEAS_REP includes measurement results and event IDs (Identifiers) for a predetermined number (e.g., 6) of best GSM cells, transmitted from a RR/GRR 18 to the URRC 28 along with a GSM measurement indication message RRTOURRC_GSM_MEAS_IND as will be described later in conjunction with FIG. 6. In addition, the measurement report message MEAS_REP includes BSIC verified status and GsmCarrier RSSI (Received Signal Strength Indicator) for each GSM cell.

"Events" refer to a mechanism for informing a network by a UE according to signal levels of a current RAT and another RAT. Orders for the events are transmitted to the UE along with a measurement control message each time a UTRAN requests measurement. The UE checks an event to be triggered according to signal levels of a current RAT and another RAT. When reporting criteria are matched, the event to be triggered is transmitted to the UTRAN through a "measurement report." A detailed description of the events will be described below according to event IDs.

Event 3*a* refers to an event that is ordered by a UTRAN when an estimated quality of a UTRAN frequency in use is lower than or equal to a threshold and an estimated quality of another system (GSM) is higher than or equal to a threshold. A UE transmits a report when the estimated quality of a frequency in use is lower than or equal to a value of "its system threshold" IE, and time to trigger and hysteresis occur, or when estimated quality of another system is higher than or equal to a value of "another system threshold" IE, and time to trigger and hysteresis occur. A corresponding report includes specific information for another system, and top priority CPICH (FDD) and priority CCPH (TDD) at a frequency in use.

Event 3*b* refers to an event that is ordered by a UTRAN when an estimated quality of another system is lower than or equal to a threshold. A UE transmits a report when the estimated quality of another system is lower than or equal to a value of "another system threshold" IE, and time to trigger and hysteresis occur. A corresponding report includes specific information for another system.

Event 3*c* refers to an event that is ordered by a UTRAN when an estimated quality of another system is higher than or equal to a threshold. A UE transmits a report when the estimated quality of another system is higher than or equal to a value of "another system threshold" IE, and time to trigger and hysteresis occur. A corresponding report includes specific information for another system.

Event 3*d* changes a best cell in another system if an estimated quality of cells in another system is higher than an estimated quality of the current best cell. Event 3*d* is ordered by a UTRAN and the event will trigger a report to be transmitted from the UE, when arrival of time to trigger and hysteresis occur. A corresponding report includes information for the best cell of another system.

If it is determined in step 202 that the reporting mode is not set to "periodic," the URRC 28 performs a process S12. That is, in step 208, the URRC 28 checks whether a reporting mode is set to 'event-triggered'. If the reporting mode is set to 'event-triggered', the URRC 28 checks in step 210 whether an event ID is 3*a*. If an event ID is 3*a*, the URRC 28 compares quality of a serving cell with cell measurement results in step 212. If it is determined in step 214 that GSM cell measurement results have triggered Event 3*a*, the URRC 28 transmits a measurement report message MEAS_REP to the UTRAN 5 in step 216 of a process S13. The measurement report message MEAS_REP includes an event ID and measurement results on GSM cells that triggered Event 3*a*.

However, if the GSM cell measurement results have not triggered Event 3*a* in step 214, the URRC 28 does not transmit the measurement report message MEAS_REP to the UTRAN 5. Also, if it is determined in step 210 that an event ID is not 3*a*, the URRC 28 performs the process S13.

Figure 6:
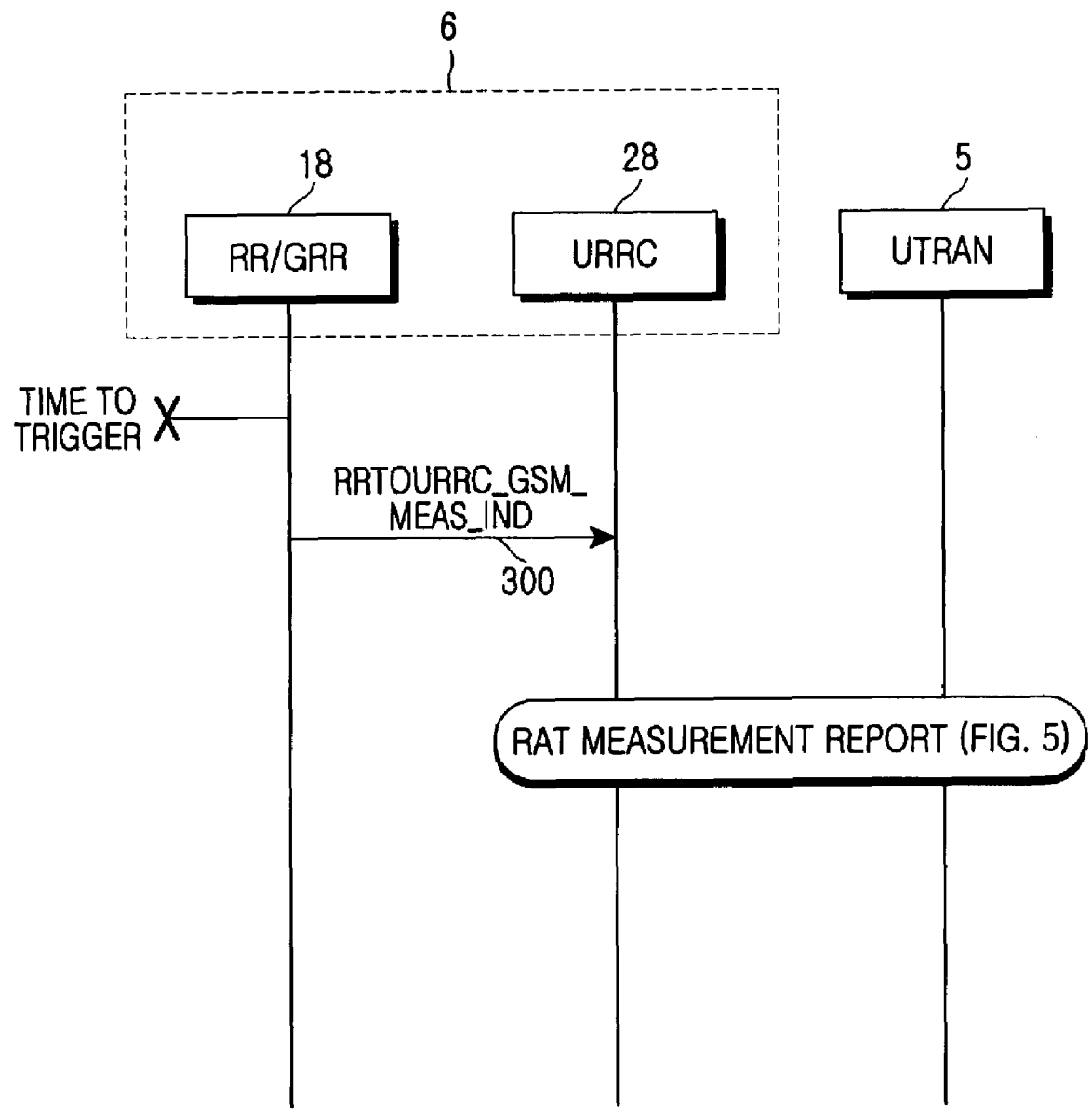
FIG. 6 is a ladder diagram illustrating a procedure for transmitting a GSM measurement indication message RRTOURRC_GSM_MEAS_IND to a URRC by an RR/GRR upon arrival of a period, in an inter-RAT measurement method in a connected mode according to the first embodiment of the present invention.

Referring to FIG. 6, when time to trigger has come, an RRR/GRR 18 transmits, in step 300, a GSM measurement indication message RRTOURRC_GSM_MEAS_IND to a URRC 28. Then, the RAT measurement report described in conjunction with FIG. 5 is performed.

Figure 7:
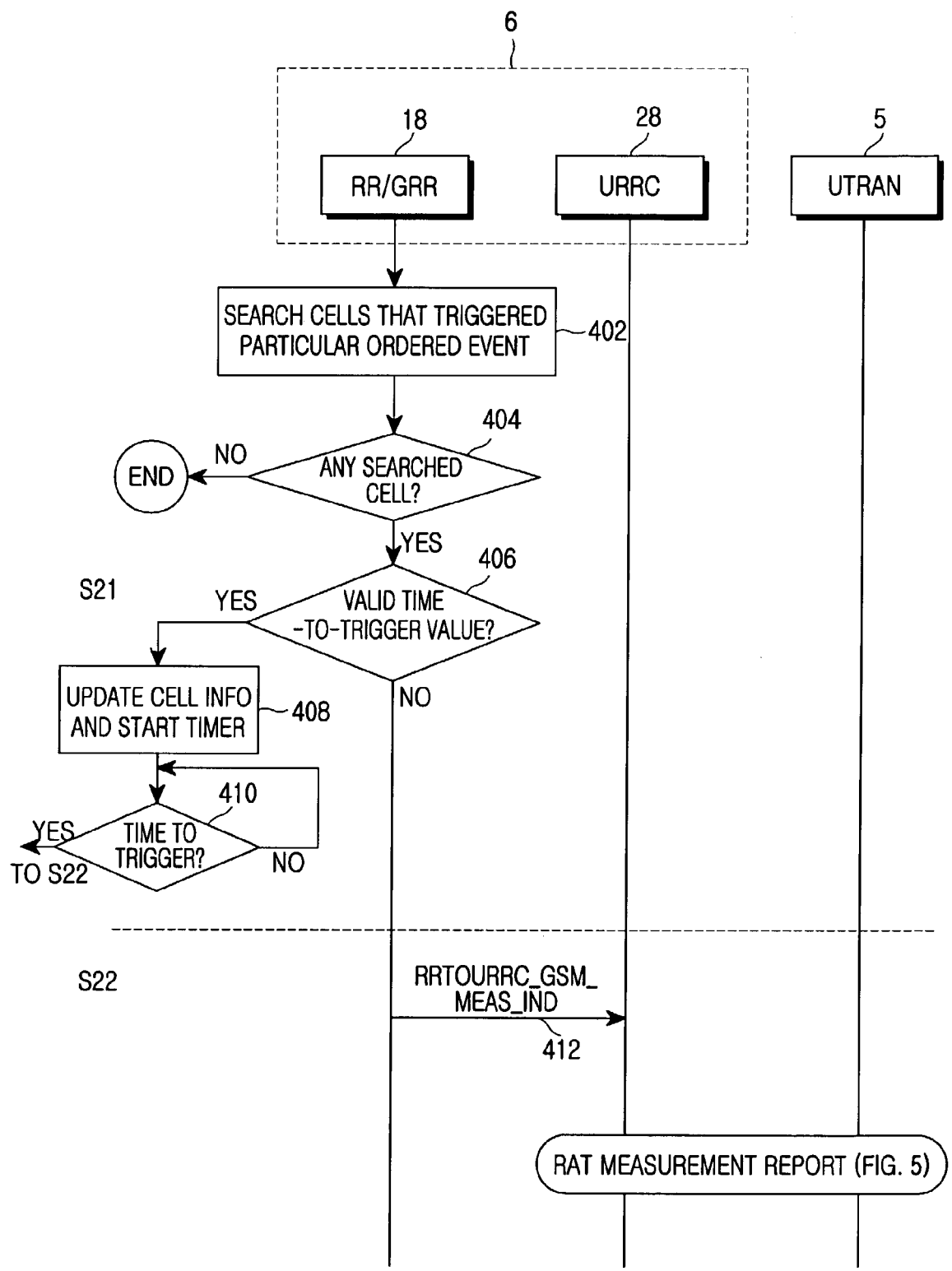
FIG. 7 is a ladder diagram illustrating a procedure for transmitting a GSM measurement indication message RRTOURRC_GSM_MEAS_IND to a URRC by an RR/GRR when an event is triggered, in an inter-RAT measurement method in a connected mode according to the first embodiment of the present invention.

Referring to FIG. 7, an RR/GRR 18 searches cells that have triggered a particular ordered event, in step 402. The RR/GRR 18 checks in step 404 whether there is any cell that has triggered a particular ordered event. If there is an cell that has triggered the ordered event, the RR/GRR 18 checks in step 406 whether a time-to-trigger value is valid. If it is determined that the time-to-trigger value is valid, the RR/GRR 18 updates cell information and starts a timer in step 408. A detailed description of this operation will be separately made herein below.

Step #1

The RR/GRR 18 checks an event list requested by a URRC 28, and compares measurement results (e.g., signal strength event) on each GSM cell with threshold values (e.g., a list of events for which call is not set up yet) stored for each event. The RR/GRR 18 deletes a cell, measurement results of which are not matched with a threshold value, and then replaces the cell with another cell.

Step #2

If the cell or a particular cell in a cell list has generated an event and the event generation time is appropriate, the RR/GRR 18 updates the cell list based on an event ID, and starts a timer TimeTOTriggerTimer based on a time value stored in a time-to-trigger parameter. Here, the term "time-to-trigger" refers to a time required in detecting an event, performing measurement, and then reporting the measurement result.

The URRC 28 issues an order to repeat the Step #2 for all event IDs.

After step 408, the RR/GRR 18 checks in step 410 whether an event generation timer has expired. If the event generation timer has expired, or if the time-to-trigger value is invalid in step 406, the RR/GRR 18 performs a process S22. That is, in step 412, the RR/GRR 18 transmits a GSM measurement indication message RRTOURRC_GSM_MEAS_IND to the URRC 28 according to an event ID. The GSM measurement indication message RRTOURRC_GSM_MEAS_IND includes the maximum measurement results on a predetermined number of GSM cells (e.g., a maximum of 6 cells having good measurement results), time-to-trigger for which has already been started. Upon receiving the measurement indication message RRTOURRC_GSM_MEAS_IND, the URRC 28 reports the measurement results to a UTRAN 5.

Meanwhile, because the calculation and comparison values include measurement results on the serving cells belonging to a current RAT (UMTS), if the event ID (event list and ID corresponding to each event) must be adjusted in a UMTS UE, the URRC 28 checks the event ID. Specifically, when a current serving cell is a UMTS cell and all neighboring cells are also UMTS cells, each event ID must be handled in UMTS or RR/GRR 18. Therefore, the RR/GRR 18 checks whether there is an event ID that must be handled in UMTS.

(i) Quality estimation is performed from an active set.

(ii) Measurement results acquired based on the quality estimation are compared.

If a GSM cell is superior to a UTRAN cell and a corresponding event has occurred, the URRC 28 prepares a measurement report message for GSM cells that have generated the corresponding event, and then sends the measurement report message to the UTRAN 5.

If the event ID is not required by a UMTS UE for adjustment, the URRC 28 prepares a measurement report message for the GSM cells, corresponding event IDs for which have been generated, and sends the measurement report message to the UTRAN 5.

Figure 8:
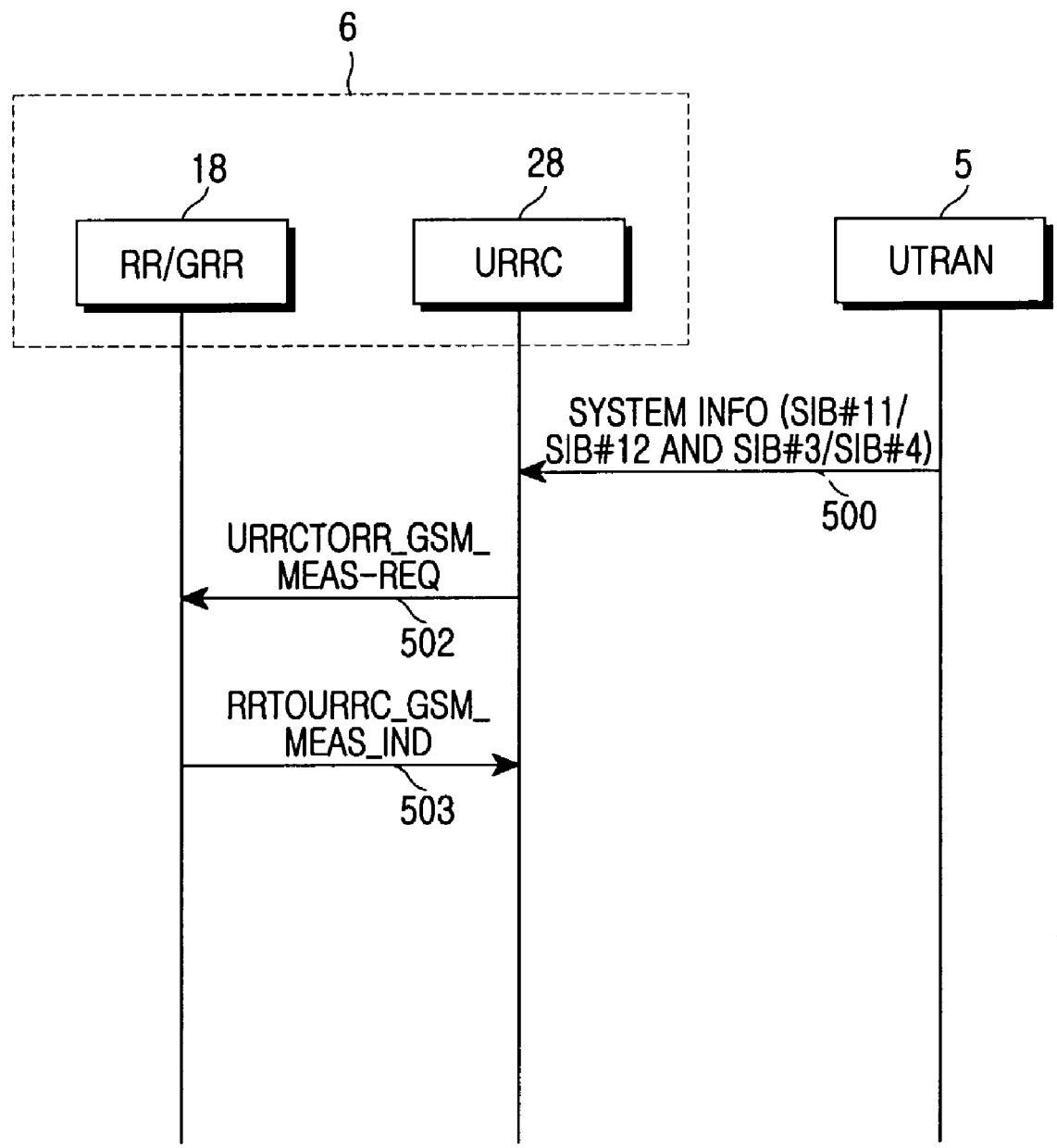
FIG. 8 is a ladder diagram schematically illustrating a RAT measurement method in an idle mode according to the first embodiment of the present invention.
Figure 9:
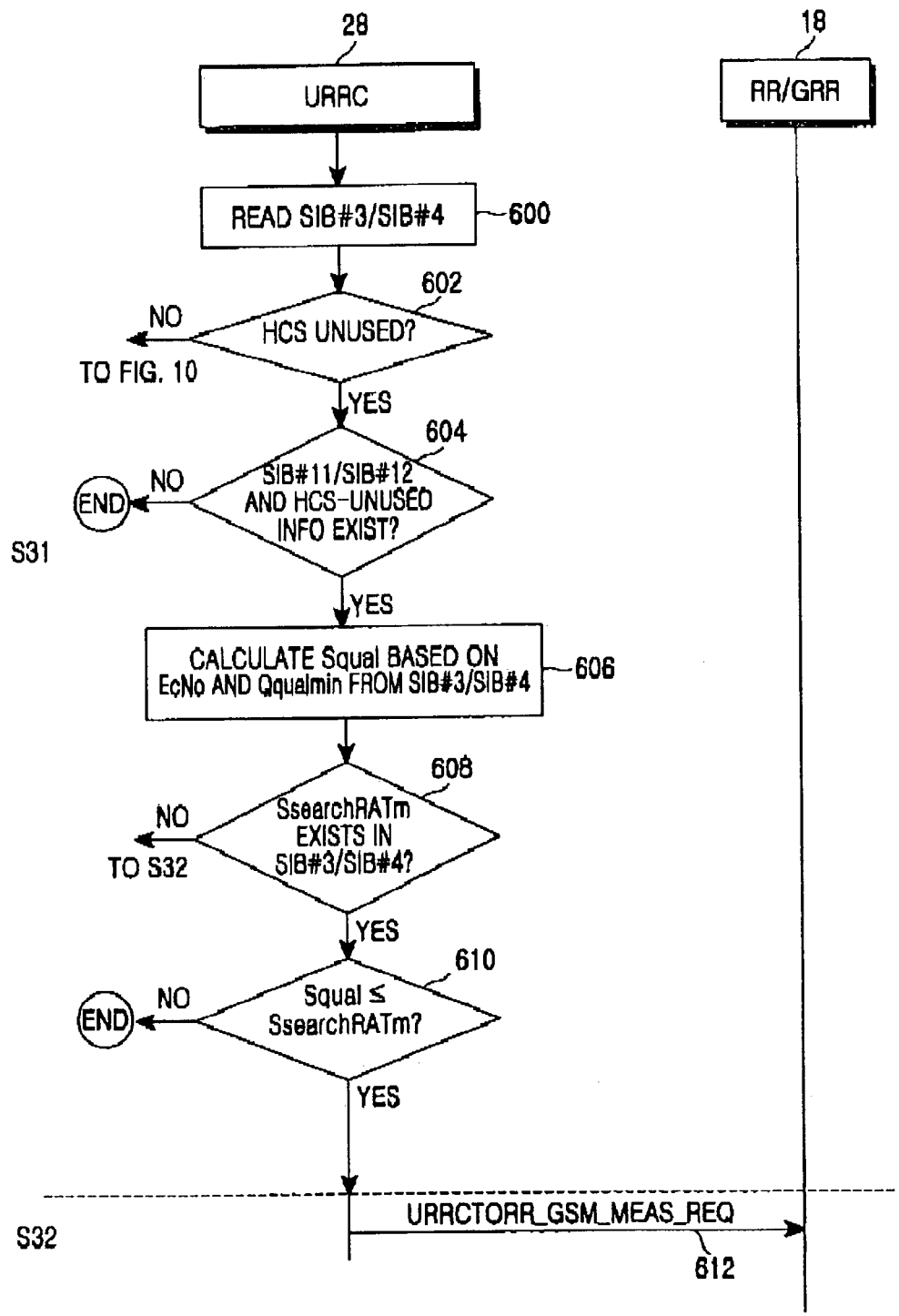
FIG. 9 illustrates a measurement request method between a URRC and an RR/GRR according to presence/absence of SIB#11 or SIB#12 and HCS-unused information.
Figure 10:
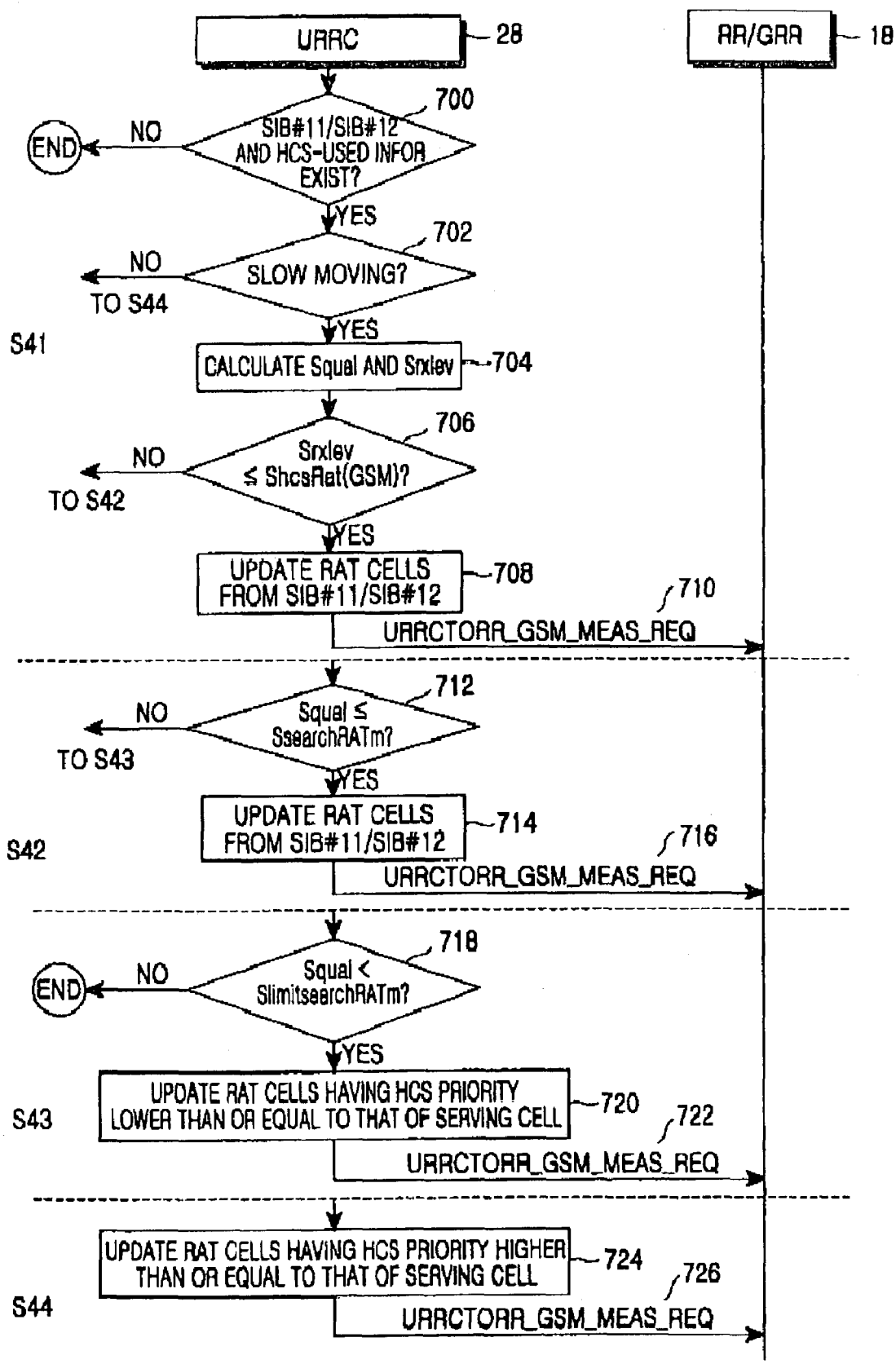
FIG. 10 is a ladder diagram illustrating a measurement request method between a URRC and an RR/GRR according to presence/absence of SIB#11 or SIB#12 and HCS-used information.

FIGS. 8 to 10 are ladder diagrams illustrating a RAT measurement method in an idle mode according to a first embodiment of the present invention.

A UE can extend its battery life by avoiding measuring GSM cells in an idle mode. When UMTS cells have high signal strength or when a UE does not perform a roaming service in order to extend its battery life, the UE does not need to measure GSM cells. When the UE moves from DCH to the idle mode or from the connected mode to the idle mode, idle mode RAT measurements can be started.

Referring to FIG. 8, if a UTRAN 5 transmits system information (SIB#11 or SIB#12, and SIB#3 or SIB#4) to a URRC 28 in step 500, then the URRC 28 transmits, in step 502, a GSM measurement request message URRCTORR_GSM_MEAS_REQ to an RR/GRR 18. In step 504, the RR/GRR 18 transmits a GSM measurement indication message RRTOURRC_GSM_MEAS_IND to the URRC 28.

FIG. 9 illustrates a measurement request method between a URRC and an RR/GRR according to a presence/absence of SIB#11 or SIB#12 and HCS (Hierarchical Cell Structure)-unused information. A URRC 28 reads SIB#3/SIB#4 in step 600, and checks in step 602 whether a current state is an HCS-unused state. If a current state is not an HCS-unused state, measurement for the HCS-used state is performed between the URRC 28 and an RR/GRR 18 as illustrated in FIG. 10. However, if the current state is an HCS-unused state, the URRC 28 checks in step 604 whether there is HCS serving cell information HCS_ServingCellInformation. If there is the HCS serving cell information HCS_ServingCellInformation, the URRC 28 calculates, in step 606, cell selection quality (hereinafter referred to as "Squal") depending upon $E_c/N_O$ (Ratio of Energy per modulating bit to the noise spectral density) and a minimum required quality level (dB) in the cell (hereinafter referred to as "Qqualmin"), both extracted from SIB#3 or SIB#4. The URRC 28 checks in step 608 whether a predetermined threshold value SsearchRATm (Slimit, SearchRATm) exists in SIB#3 or SIB#4. The SsearchRATm is used for a measurement rule for cell reselection when HCS is used, and represents a RAT specific threshold value. The SsearchRATm is transmitted to a UTRAN along with SIB#3 or SIB#4. The SsearchRATm represents a RAT specific threshold value in a serving UTRAN where a UE is not required to perform RAT measurement in a RAT "m," and its unit is dB. Herein, "m" indicates a type of the RAT, i.e., CDMA2000 or GSM, and has a value of 1 to 15.

If the threshold value SsearchRATm exists in SIB#3 or SIB#4, the URRC 28 checks in step 610 whether Squal is lower than or equal to SsearchRATm. If Squal is lower than or equal to SsearchRATm, the URRC 28 transmits a measurement request message URRCTORR_GSM_MEAS_REQ to the RR/GRR 18 in step 612 of a process S32. The measurement request message URRCTORR_GSM_MEAS_REQ is configured into (17, enMeasCommend, InterRatCell Info). That is, in an idle mode, a UE receives no measurement control message from a UTRAN 5, and must measure RAT cell information received from SIB#11 and SIB#12. The SIB cannot have any identity for RAT cell information. Therefore, one integer (e.g., 17) is used between a URRC and an RR/GRR. The enMeasCommend represents start or stop. If the enMeasCommend represents "start," the RR/GRR starts measurement with a measurement identity 17. On the contrary, if the enMeasCommend represents "stop," the RR/GRR stops the measurement using the integer no matter which measurement was performed. The InterRatCell Info represents a RAT cell information pointer including all RAT cells to be measured under the measurement identity 17.

If the threshold value SsearchRATm does not exist in SIB#3 or SIB#4 in step 608 of a process S31, the URRC 28 performs the process S32. If there are no SIB#11 or SIB#12 and HCS-unused information in step 604 or if Squal is higher than SsearchRATm in step 610, the URRC 28 ends the procedure.

A UMTS-PHY 10a will periodically transmit measurement results of a serving cell to the URRC 28 along with UMTS-PHY_URRC_SERVING_CELL_MEAS_IND at received signal code power (hereinafter referred to as "FSCP") and $E_C/N_O$. The URRC 28 will compare threshold values SsearchinterRAT and SlimitsearchRATm from SIB#3 or SIB#4 with measurement results $E_C/N_O$ and RSCP(Received Signal Code Power) of the serving cell.

FIG. 10 is a ladder diagram illustrating a measurement request method between a URRC and an RRR/GRR according to a presence/absence of SIB#11 or SIB#12 and HCS-used information. If serving cell measurement values are larger than threshold limits received from SIB#3 or SIB#4, a UE is not required to perform measurement on GSM cells.

A URRC 28 checks in step 700 whether there are SIB#11 or SIB#12 and HCS-used information. If there are SIB#11 or SIB#12 and HCS-used information, the URRC 28 checks in step 702 whether a UE 6 is moving slow. If the UE 6 is not moving slow, the URRC 28 performs a process S44.

If it is determined in step 702 that the UE 6 is moving slow, in step 704, the URRC 28 calculates Squal, based on $E_C/N_O$ and Qqualmin (Minimum required quality level in the cell), and Srxlev (Cell Selection RX level value), based on Pcompensation [max(UE_TXPWR_MAX_RACH—P_MAX, 0)] (The "UE_TXPWR_MAX_RACH" means Maximum TX power level an UE may use when accessing the cell on RACH, and the "P_MAX" means Maximum RF output power of the UE), a minimum required reception level (dBm) in the cell (hereinafter referred to as "Qrxlevmin"), and RSCP from SIB#3/SIB#4. The Pcompensation represents max (UE_TXPWR_MAX_RACH_P_MAX, 0), and if it is larger than 0, a value UE_TXPWR_MAX_RACH_P_MAX is selected. The UE_TXPWR_MAX_RACH represents a maximum transmission power level (dBm) that can be used by a UE when accessing a cell in RACH (Reverse Access Channel) read from system information. The P_MAX represents a maximum RF output power (dBm) of a UE.

In step 706, the URRC 28 checks whether Srxlev is smaller than or equal to ShcsRat (GSM). If Srxlev is greater than ShcsRat (GSM), the URRC 28 performs a process S42 that will be described later. Here, the ShcsRat represents a threshold value used for measurement rules for cell reselection when HCS is used. That is, this represents RAT specific threshold values in a serving cell used within the RAT measurement rules. If Srxlev is smaller than or equal to ShcsRat (GSM) in step 706, the URRC 28 updates RAT cells from SIB#11 or SIB#12 in step 708. The URRC 28 transmits a measurement request message URRCTORR_GSM_MEAS_REQ to an RR/GRR 18 in step 710.

Describing the process S42, the URRC 28 checks in step 712 whether Squal is smaller than or equal to SsearchRATm. If Squal is greater than SsearchRATm, the URRC 28 performs the process S43 that will be described later. However, if Squal is smaller than or equal to SsearchRATm, the URRC 28 updates RAT cells from SIB#11 or SIB#12 in step 714. Thereafter, the URRC 28 transmits a measurement request message URRCTORR_GSM_MEAS_REQ to the RR/GRR 18 in step 716.

Describing the process S43, the URRC 28 checks in step 718 whether Squal is smaller than SlimitsearchRATm. If Squal is smaller than SlimitsearchRATm, the URRC 28 updates RAT cells, HCS priority of which is lower than or equal to that of a serving cell, in step 720. Thereafter, the URRC 28 transmits a measurement request message URRCTORR_GSM_MEAS_REQ to the RR/GRR 18 in step 722.

Describing the process S44, the URRC 28 updates RAT cells, HCS priority of which is higher than or equal to that of a serving cell, in step 724. Thereafter, the URRC 28 transmits a measurement request message URRCTORR_GSM_MEAS_REQ to the RR/GRR 18 in step 726.

If serving cell measurement values are smaller than threshold limits received from SIB#3 or SIB#4, a UE can acquire the latest GSM cell information from SIB#11 or SIB#12, and transmit the measurement request to the RR/GRR 18 along with a default measurement ID for RAT measurements.

When receiving RRTOURRC_GSM_MEAS_IND for the default measurement ID, the UE does not transmit a measurement report to a UTRAN 5. Such measurement results can be used for cell reselection in the idle mode.

Figure 11:
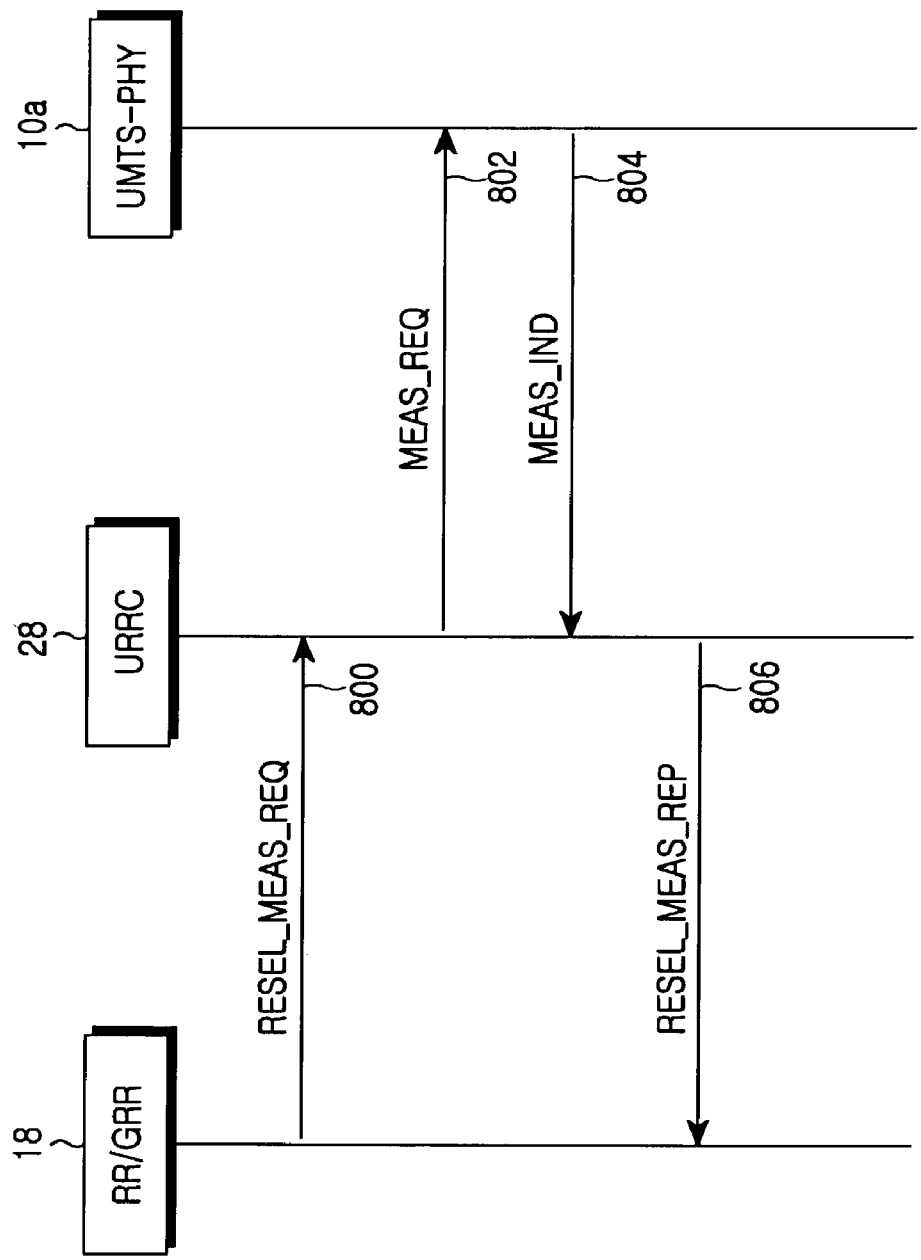
FIG. 11 is a ladder diagram illustrating a message exchanging procedure for performing inter-RAT measurement according to a second embodiment of the present invention.
Figure 12:
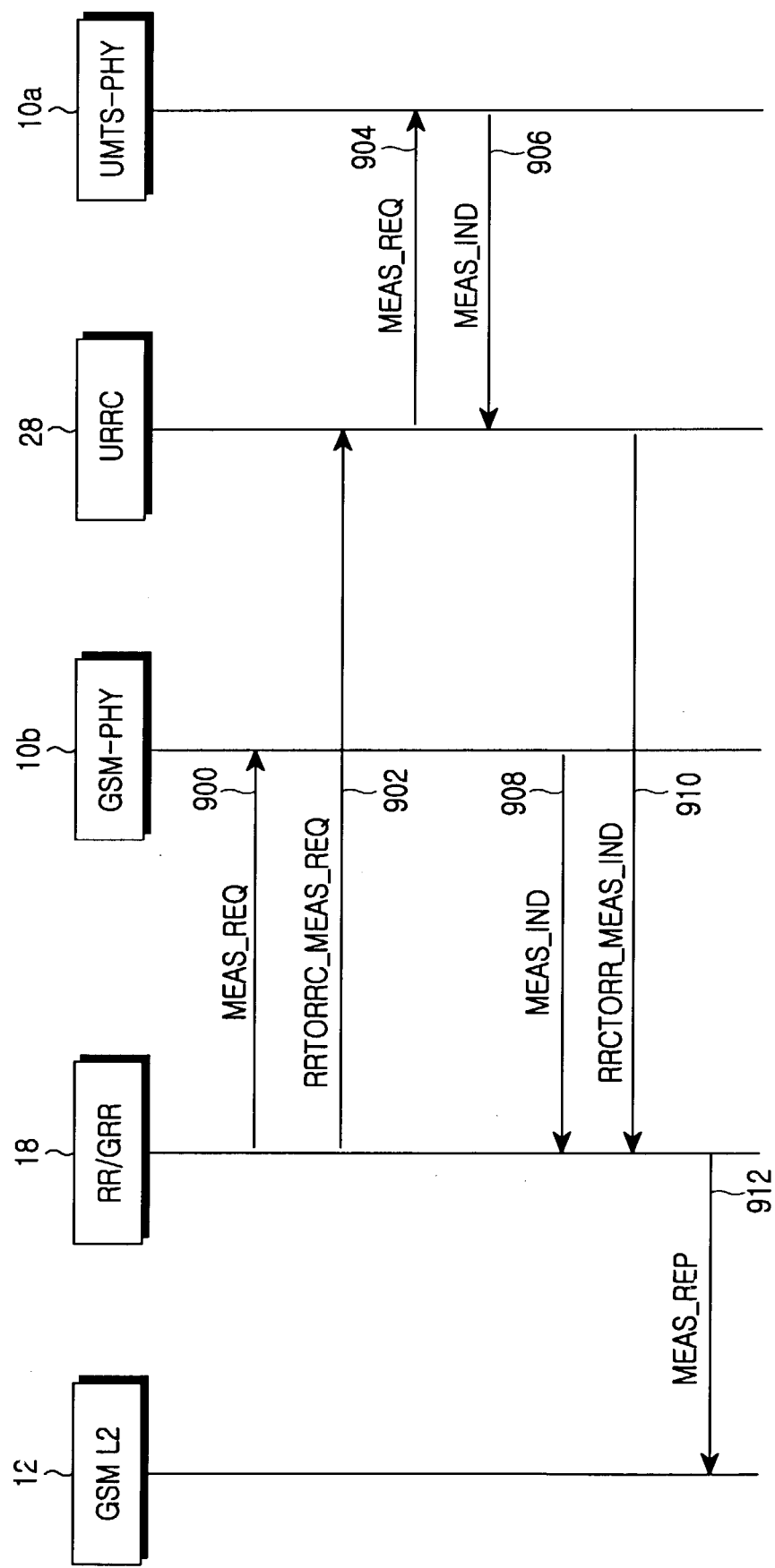
FIG. 12 is a ladder diagram illustrating a message exchanging procedure for performing inter-RAT measurement report according to the second embodiment of the present invention.

With reference to FIGS. 11 and 12, a description will now be made of a message interface for inter-RAT measurement between a GSM/GPRS protocol stack and a UMTS protocol stack in the case where GSM/GPRS is active RAT in the UE 6. FIG. 11 illustrates a message exchanging procedure for handling inter-RAT measurement according to a second embodiment of the present invention, and FIG. 12 illustrates a message exchanging procedure for handling inter-RAT measurement report according to a second embodiment of the present invention. Although the present invention will be described herein with reference to only GSM, the invention can also be applied in the same way to GPRS.

First, a procedure for handling measurement for inter-RAT cell reselection will be described with reference to FIG. 11. If reselection measurement for 3G cells, i.e., UMTS cells, given by a BSS 3 of a network is triggered, an RR/GRR 18 sends a reselection measurement request message RESEL_MEAS_REQ to a URRC 28 in step 800, to request measurement for a list of the 3G cells. At this point, the RR/GRR 18 suspends a GSM/GPRS physical layer 10b in the PHY 10 before sending a measurement request for UMTS cells to the URRC 28. The reselection measurement request message RESEL_MEAS_REQ provides the URRC 28 with a list including PSC (Primary Scrambling Code) and FDD_ARFCN (Frequency Division Duplex_Absolute Radio Frequency Channel) of UMTS cells.

Upon receiving the reselection measurement request message RESEL_MEAS_REQ, the URRC 28 sends a measurement request message MEAS_REQ to a UMTS physical layer 10a in the PHY 10, i.e., UMTS-PHY 10a, in step 802, thereby activating the UMTS-PHY 10a and requesting a measurement and report. The UMTS-PHY 10a then measures UMTS cells belonging to a requested 3G cell, i.e., the UTRAN 5, and reports, in step 804, to the URRC 28 measured values of RSCP (Received Signal Code), RSSI (Received Signal Strength Indicator), Ec/No (Ratio of energy per modulating bit to the noise spectral density), PSC (Primary Scrambling Code), and ARFCN (Absolute Radio Frequency Channel) through a measurement indication message MEAS_IND. The URRC 28 then reports the values of RSSI, Ec/No and RSCP measured by the UMTS-PHY 10a to the RR/GRR 18 through a reselection measurement report message RESEL_MEAS_REP in step 806. At this point, the URRC 28 does not report the measurement value for the 3G cells, if it fails to decode PSC received from the UMTS-PHY 10a. A UE 6 can determine inter-RAT cell reselection based on the inter-RAT measurement values.

Next, a procedure for handling measurement reporting for inter-RAT cell reselection will be described with reference to FIG. 12. Although the present invention will be described with reference to inter-RAT measurement reporting in a packet transmission state, the invention is also applicable in GSM-Dedicated state. For reference, a packet transmission mode and a packet idle mode in GSM/GPRS are similar to a connected mode and an idle mode in UMTS, respectively. In the packet transmission mode, a UE 6 has an end-to-end connection with a network, and in the packet idle mode, the UE 6 checks downlink broadcast channels and performs idle mode measurement in GSM/GPRS.

In FIG. 12, an RR/GRR 18 detects 3G cell parameters needed to trigger inter-RAT measurement from a broadcast message or a specific L3 message, provided from a network, i.e., a BSS 3. Such messages fundamentally include lists of PSC, FDD_ARFCN, and BA (BCCH Allocation), and threshold parameters. A BA list is a list of beacon frequencies of neighboring cells with which the UE 6 is synchronized and is to perform measurement thereon. In step 900, the RR/GRR 18 sends a measurement request message MEAS_REQ to a GSM physical layer, i.e., a GSM/GPRS-PHY 10*b* in the PHY 10, to request the GSM/GPRS-PHY 10*b* to measure GSM cells. The measurement request message MEAS_REQ provides the BA list, a report period, and a scale order. In step 902, the RR/GRR 18 sends a URRC 28 a measurement request message RR-TO-RRC_MEAS_REQ for requesting a start of measuring 3G cells, i.e., UMTS cells belonging to a UTRAN 5. The measurement request message RR-TO-RRC_ MEAS_REQ provides a PSC list, an FDD_ARFCN, and a report period. Upon receiving the measurement request message RR-TO-RRC_MEAS_REQ, in step 904, the URRC 28 sends a measurement request message MEAS_REQ to a UMTS physical layer, i.e., a UMTS-PHY 10*a* in the PHY 10, to request measurement and report on the 3G cells. The UMTS-PHY 10*a* then performs measurement on the requested 3G cells, i.e., UMTS cells belonging to the UTRAN 5, and after the measurement, sends the measurement value to the URRC 28 along with a measurement indication message MEAS_IND in step 906.

Upon receiving the measurement request message MEAS_REQ in step 900, the GSM/GPRS-PHY 10*b* performs measurement on a serving cell Scell and neighboring cells Ncell, scales the measurement values according to a scale order, and reports the scaled measurement values to the RR/GRR 18 along with a Scell/Ncell measurement indication message MEAS_IND, in step 908. Measurement parameters reported by the measurement indication message MEAS_IND include Rxlev, Rxlev_sub, Rxqual_full, and Rxqual_sub. Upon receiving the measurement indication message MEAS_IND from the UMTS-PHY 10*a*, the URRC 28 sends a measurement indication message RRC-TO-RR_MEAS_IND to the RR/GRR 18 in step 910. Measurement parameters reported by the measurement indication message RRC-TO-RR_MEAS_IND include RSCP, RSSI, and Ec/No.

Upon receiving the measurement indication messages MEAS_IND and RRC-TO-RR_MEAS_IND from the GSM/GPRS-PHY 10*b* and URRC 28 in steps 908 and 910, the RR/GRR 18 transmits, in step 912, the measurement values for a GSM cell from the measurement indication message MEAS_IND and the measurement values for a UMTS cell from the measurement indication message RRC-TO-RR_MEAS_IND to the GSM L2 12, i.e., the BSS 3, along with a measurement report message MEAS_REP according to a network control order parameter. The network can send handover and cell change orders to the UE 6 according to a state of the UE 6 based on the inter-RAT measurement value reported from the UE 6.

As stated above, whether the UE is in an idle mode or in a connected mode, if GSM/GPRS RAT is active RAT and UMTS RAT is passive RAT, interaction between a GSM/GPRS protocol stack and a UMTS protocol stack for performing inter-RAT measurement is accomplished by the RR/GRR and URRC interfaces. In addition, by separating a measurement procedure by a GSM/GPRS physical layer and a measurement procedure by a UMTS physical layer, the present invention effectively performs inter-RAT measurement without increasing software complexity of the GSM/GPRS physical layer and the UMTS physical layer. That is, the GSM/GPRS physical layer measures only GSM/GPRS cells requested by the RR/GRR, while the UMTS physical layer measures only UMTS cells requested by the URRC. As a result, the UMTS RAT measurement is performed without increasing complexity of the GSM/GPRS physical layer. The passive UMTS RAT undergoes normal measurement, whereas the active GSM/GPRS RAT is subjected to inter-RAT measurement. Furthermore, in the GSM/GPRS protocol stack, an increase in complexity of a 3G, or UMTS, measurement function can be prevented, contributing to an increase in memory efficiency.

As described above, the present invention divides workload for RAT measurement between the UMTS-RRC and the RR/GRR. In the case of the URRC versus the RR, since all cells are included in GSM, it is preferable to compare and classify GSM cell measurement results by the RR/GRR rather than the URRC. In the case of UMTS-GSM, Event 3*a* will be defined by the UMTS-RRC. This is because Event 3*a* is too complex to be realized in the RR/GRR since quality estimation is based on the measurement results of an active set in UMTS. When the measurement results of a serving cell are lower than threshold values, RAT measurement will be triggered.

In a dual-mode UE, interaction between a GSM/GPRS protocol stack and a UMTS protocol stack for performing inter-RAT measurement is effectively achieved by the RR/GRR and URRC interfaces, the UE can determine inter-RAT cell reselection based on the inter-RAT measurement values, and the network can send handover and cell change orders to the UE according to a state of the UE based on the inter-RAT measurement values reported from the UE. In addition, the GSM physical layer L1 measures only GSM cells requested by the RR/GRR, and the UMTS-PHY measures only UMTS cells requested by the UMTS-URRC and separates a measurement procedure by the GSM/GPRS physical layer and a measurement procedure by the UMTS physical layer. As a result, inter-RAT measurement can be effectively performed without increasing software complexity of the GSM/GPRS physical layer and the UMTS physical layer, saving memory capacity.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for performing inter-RAT cell measurement in a dual-mode user equipment (UE) in a connected mode, which supports both GSM/GPRS (Global System for Mobile communication/General Packet Radio Service) RAT (Radio Access Technology) and UMTS (Universal Mobile Telecommunications System) RAT, the method comprising the steps of:
   (a) transmitting a measurement control message from a UTRAN (UMTS Terrestrial Radio Access Network) of the UMTS RAT to a URRC (UMTS Radio Resource Control) of a UMTS network layer in the UE;
   (b) upon receiving the measurement control message, sending, by the URRC, a measurement request for GSM cells to an RR/GRR (Radio Resource/GPRS Radio Resource) of a GSM/GPRS network layer;
   (c) activating, by the RRR/GRR, a GSM physical layer and sending a measurement request for the GSM cells to the GSM physical layer;
   (d) measuring, by the GSM physical layer, the GSM cells and reporting a measurement value to the RR/GRR;
   (e) reporting, by the RR/GRR, the measurement value for the GSM cells, received from the GSM physical layer, to the URRC; and (f) reporting, by the URRC, the received measurement value for the GSM cells to the UTRAN.

2. The method of claim 1, wherein the step (f) comprises the steps of:
(f1) checking a reporting mode by the URRC;
(f2) if the reporting mode is set to 'periodic', preparing a measurement report message and transmitting the measurement report message to the UTRAN on the basis of predetermined time; and
(f3) if the reporting mode is set to 'event-triggered', transmitting a measurement report message to the UTRAN in case there exists any cell that triggered a particular ordered event by the RR/GRR.

3. The method of claim 2, wherein the measurement report message includes a measurement result and an event ID for a predetermined number of best GSM cells, transmitted from the RR/GRR to the URRC through a GSM measurement indication message.

4. The method of claim 3, wherein the measurement report message further includes BSIC (Base transceiver Station Identity Code) verified status and a GsmCarrier RSSI (Received Signal Strength Indicator) for each GSM cell.

5. The method of claim 2, wherein in the step (f3) comprises the steps of
checking whether a time-to-trigger value is valid;
if the time-to-trigger value is valid, updating cell information, starting a timer, and then performing measurement report to the URRC according to an event ID; and
if the time-to-trigger value is invalid, directly performing measurement report to the URRC according to the event ID.

6. A method for performing inter-RAT cell measurement in a dual-mode user equipment (UE) in an idle mode, which supports both GSM/GPRS (Global System for Mobile communication/General Packet Radio Service) RAT (Radio Access Technology) and UMTS (Universal Mobile Telecommunications System) RAT, the method comprising the steps of:
(a) transmitting, by a UTRAN (UMTS Terrestrial Radio Access Network), system information to a URRC (UMTS Radio Resource Control) of a UMTS network layer in the UE;
(b) sending, by the URRC, a measurement request for GSM cells to an RR/GRR (Radio Resource/GPRS Radio Resource) of a GSM/GPRS network layer in the UE; and
(c) reporting, by the RR/GRR, a measurement value for the GSM cells to the URRC.

7. The method of claim 6, wherein the step (b) comprises the steps of:
reading, by the URRC, system information, and checking whether a current state is an HCS (Hierarchical Cell Structure)-unused state;
if the current state is an HCS-unused state, checking whether there is HCS serving cell information;
if there is the HCS serving cell information, calculating cell selection quality (Squal) based on $E_c/N_O$ and a minimum required quality level in the cell, from one of an SIB#3 (System Information Block #3) and an SIB#4;
[Yes, it can. Thank you.]
checking whether a predetermined threshold value (SsearchRATm) exists in the one of the SIB#3 and the SIB#4, and checking whether the Squal is smaller than or equal to the SsearchRATm, if the threshold value SsearchRATm exists in the one of the SIB#3 and the SIB#4; and if the Squal is smaller than or equal to the SsearchRATm, transmitting a measurement request message to the RR/GRR.

8. The method of claim 7, further comprising the steps of:
if the current state is the HCS-used state, checking by the URRC whether there is one of an SIB#11 and an SIB#12, and HCS-used information;
if there is the one of the SIB#11 and-the SIB#12, and the HCS-used information, checking whether the UE is moving fast; and
if the UE is moving fast, updating RAT cells and transmitting a measurement request message to the RR/GRR.

9. A method for performing inter-RAT cell measurement in a dual-mode user equipment UE that supports GSM/GPRS (Global System for Mobile communication/General Packet Radio Service) RAT (Radio Access Technology) and UMTS (Universal Mobile Telecommunications System) RAT, the method comprising the steps of:
sending a measurement request for UMTS cells from a RR/GRR (Radio Resource/GPRS Radio Resource) of a GSM/GPRS network layer in the UE to a URRC (UMTS Radio Resource Control) of a UMTS network layer in the UE;
activating, by the URRC, a UMTS physical layer in the UE, and sending a measurement request for the UMTS cells to the UMTS physical layer;
measuring, by the UMTS physical layer, the UMTS cells and reporting a measurement value to the URRC; and
reporting, by the URRC, the measurement value for the UMTS cells received from the UMTS physical layer, to the RR/GRR.

10. The method of claim 9, wherein the RR/GRR suspends a GSM/GPRS physical layer in the UE before sending the measurement request for the UMTS to the URRC.

11. A method for performing inter-RAT cell measurement reporting in a dual-mode UE that supports both GSM/GPRS (Global System for Mobile communication/General Packet Radio Service) RAT and UMTS (Universal Mobile Telecommunications System) RAT, the method comprising the steps of:
sending a measurement request for GSM/GPRS (Global System for Mobile communication/General Packet Radio Service) cells from an RR/GRR (Radio Resource/GPRS Radio Resource) of a GSM/GPRS network layer in the UE to a GSM/GPRS physical layer in the UE;
sending a measurement request for UMTS cells from the RR/GRR to a URRC (UMTS Radio Resource Control) of a UMTS physical layer in the UE;
sending a measurement request for the UMTS cells from the URRC to a UMTS physical layer in the UE;
measuring, by the UMTS physical layer, the UMTS cells, and reporting a measurement value to the URRC;
measuring, by the GSM/GPRS physical layer, the GSM/GPRS cells, and reporting a measurement value to the RR/GRR;
reporting, by the URRC, the measurement value for the UMTS cells, received from the UMTS physical layer, to the RR/GRR; and
transmitting, by the RR/GRR, a measurement value for the GSM/GPRS cells measured by the GSM/GPRS physical layer and a measurement value for UMTS cells measured by the UMTS physical layer, to the network.

* * * * *